INVENTOR.
N. B. COLEY
BY Forest B. Hitchcock
HIS ATTORNEY

Dec. 26, 1967 N. B. COLEY 3,360,776

CODE COMMUNICATION SYSTEM

Filed April 12, 1963 11 Sheets-Sheet 2

INVENTOR.
N.B.COLEY
BY
Forest B. Hitchcock
HIS ATTORNEY

INVENTOR.
N. B. COLEY
BY Forest B. Hitchcock
HIS ATTORNEY

INVENTOR.
N.B.COLEY
BY Forest B. Hitchcock
HIS ATTORNEY

CODE COMMUNICATION SYSTEM

Filed April 12, 1963

INVENTOR.
N.B.COLEY
BY
HIS ATTORNEY

INVENTOR.
N. B. COLEY
BY Forest B. Hitchcock
HIS ATTORNEY

INVENTOR.
N. B. COLEY
BY
HIS ATTORNEY

INVENTOR.
N.B.COLEY
BY Forest B. Hitchcock
HIS ATTORNEY

FIELD STATION CODE SELECTION FOR TRANSMISSION AND RECEPTION

INVENTOR.
N. B. COLEY
BY Forest B. Hitchcock
HIS ATTORNEY

Dec. 26, 1967 N. B. COLEY 3,360,776

CODE COMMUNICATION SYSTEM

Filed April 12, 1963 11 Sheets-Sheet 10

INVENTOR.
N.B.COLEY
BY Forest B. Hitchcock
HIS ATTORNEY

Dec. 26, 1967 N. B. COLEY 3,360,776

CODE COMMUNICATION SYSTEM

Filed April 12, 1963 11 Sheets-Sheet 11

INVENTOR.
N.B.COLEY
BY Forest B. Hitchcock
HIS ATTORNEY 3,360,776
CODE COMMUNICATION SYSTEM Nelson B. Coley, Honeoye Falls, N.Y., assignor to General Signal Corporation, Rochester, N.Y., a corporation of New York Filed Apr. 12, 1963, Ser. No. 272,649
13 Claims. (Cl. 340—163)

Figure 1:
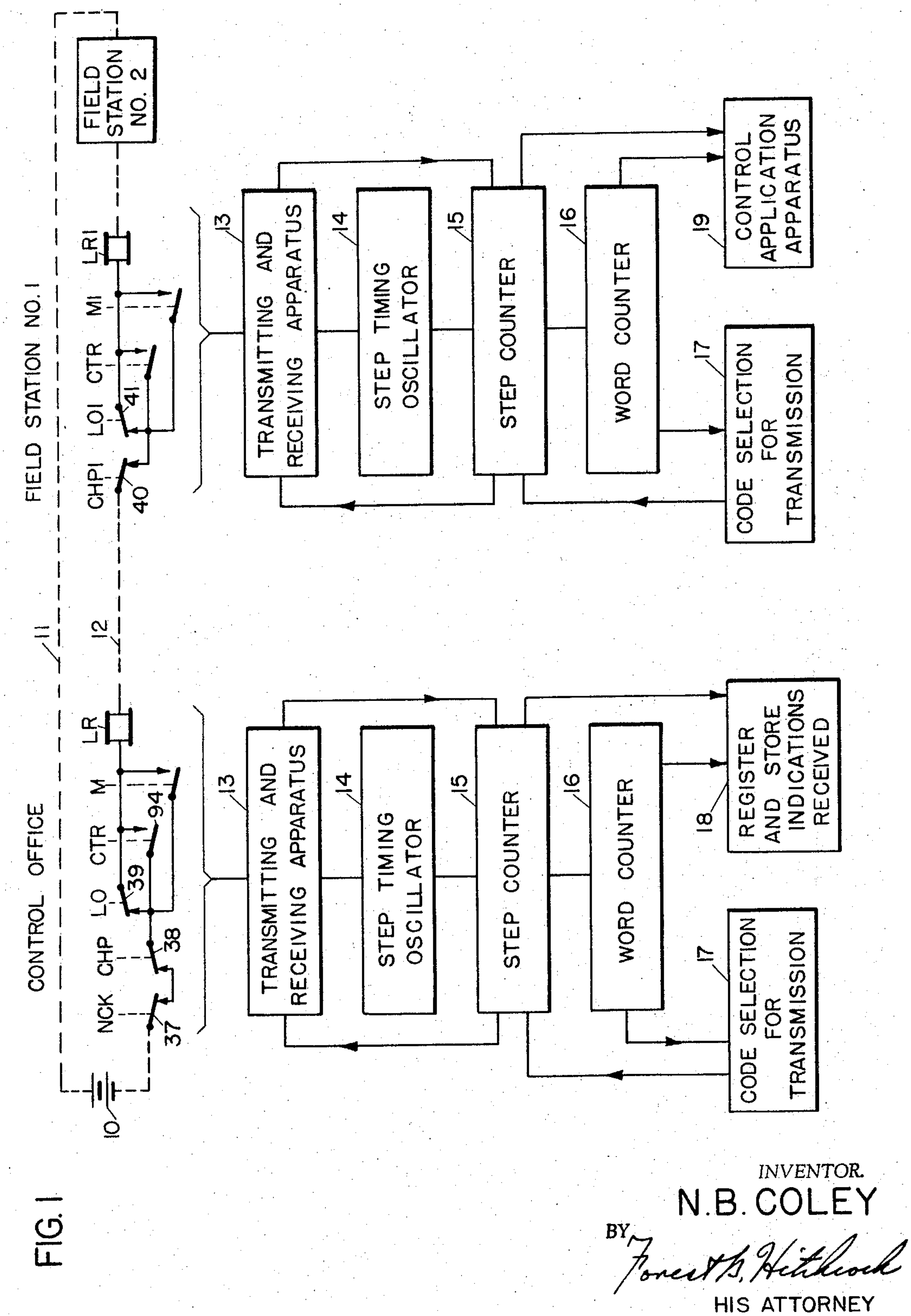

This invention relates to code communication systems, and it more particularly pertains to such systems of the multiple station type wherein a control office is connected by a suitable communication channel with a plurality of remotely spaced field stations.

The system according to the present invention is a half duplex system which is normally inactive and can be initiated into a cycle of operation for the transmission in either direction of a plurality of words, each word constituting a predetermined number of code bits. This is the type of a system which is particularly adapted, for example, to the communication of controls and/or indications in a pipe line system. It is adapted for use over a leased communication channel of the type that is known as a half duplex multi-point line. This is effectively a series communication channel wherein the line circuit must be closed at all stations in order that line relays at the stations may be energized.

The system according to the present invention operates on the start-stop principle wherein each location has a local normally inactive oscillator which, when rendered active, generates the time base for the steps of a communication cycle. It is thus essential that the oscillators at the transmitting and receiving stations be started in the proper relationship with each other. In other words, on a given cycle, the oscillator at the receiving station should always lag that at the transmitting station by the propagation time between the two points plus the sum of the operating times of the line keying relay at the transmitting station and the line relay at the receiving station. This relative timing of the oscillators at the transmitting and receiving stations provides no problem, except where there are a plurality of stations attempting to transmit at the same time. Under these conditions, where the field stations which have initiated substantially simultaneous transmission are some distance apart, the propagaiton time in the communication channel has a bearing on the synchronization of the oscillators at the stations involved. In a system such as that provided by the present invention, where automatic rejection of all but one of the stations attempting simultaneous transmission is rendered effective, it is necessary that the oscillator at the receiving station be started at a predetermined time relative to the starting of the oscillator at the transmitting station that is superior and that will transmit during the cycle. It is thus desirable to determine the matter of superiority between a plurality of stations initiating transmisison before the initiation of the oscillators at any stations.

The mode of operation in determining this superiority between a plurality of stations initiating transmission is that each station initiates a cycle by opening the communication channel for a predetermined relatively short time interval. The duration of this initial time open or spacing condition must always be greater than the maximum line propagation time encountered in the system. Thus if any other field location attempts to transmit an instant later, but before the open line interval initiated by the first location has been detected, due to propagation time, the opening of the line by this second location will occur before the first location attempts to terminate its open line condition. Under the condition just described, it will be obvious that the series line circuit will now remain open until the field location which initiated its cycle last but before having been locked out, recloses the line circuit. Under these conditions, the transmitting station which is the last to close the line circuit at the end of the initial spacing period will be superior and all other transmitting stations involved in this simultaneous start cycle will have been rejected. A transmitting station is rejected on the basis of the failure of the line relay at that station to become energized immediately upon the closure of the line circuit at that station at the end of the predetermined initial spacing period.

After the selection of a single transmitting station, the timing oscillators at that station and at the receiving station are initiated with the particular desired time lag for the receiving station. A step counter is provided at each station for counting the steps created by the oscillator at that station, one step counting device being provided for each bit of a code which constitutes a word. A word counter is also provided at each station for counting the words which constitute a communication cycle of operation, at the end of which cycle, the system enters a period of rest wherein it becomes inactive. The first word that is transmitted during a communication cycle is for station selection or station registration, and the subsequent words of the cycle are for registration of indications of groups of devices selected by the station registered or controls are registered for devices at a particular receiving station which has been identified in the first word of the cycle.

The step counting devices are also used to register and store the code that is received during the respective steps at the associated station. Thus, when a particular step is taken, the counting device for a prior step is distinctively conditioned in accordance with the character of the code bit being received. It is therefore provided that at the end of each word, the devices that have been used for counting the code bits constituting the word have also been conditioned in accordance with the code characters received during the several steps.

Station registration at a receiving station is accomplished at the end of the first word of a communication cycle by the simultaneous energization of two windings of one of a plurality of station relays from code buses which are selectively energized by the station code stored in the counting devices, the simultaneous energization of both buses being required in accordance with a two out of five code. Should there be energy on one of the other code buses, one of the windings of the station relay is short circuited in a manner to inhibit the picking up of that station relay. Subsequent to the actuation of a station registration relay upon completion of the first word, a plurality of indication registration devices are controlled to register indications during different words of the cycle in accordance with the selection of such devices by the station registration relays.

An object of the present invention is to select a superior station for transmission, of a plurality of stations attempting to transmit at the same time, on the basis of the last station to close the line circuit at the end of an initial open circuit condition being the superior station.

Another object of the present invention is to initiate step timing oscillators at transmitting and receiving stations during a cycle of operation, after superiority has been determined as to a plurality of stations attempting to transmit at the same time.

Another object of the present invention is to use a bank of step counting relays to store the code received by selectively driving down each of several of these relays after their counting functions have been completed in accordance with respective code characters being received during subsequent steps.

Another object of the present invention is to selectively control a plurality of registration devices jointly in accordance with codes stored on a bank of devices initially used for step counting and in accordance with another bank of devices used for counting words of a communication cycle.

Another object of the present invention is to control station registration relays directly from code buses in a manner wherein the energization of a particular two of the buses is required in order to energize corresponding windings of the relay simultaneously in a two out of five code, the windings being energized in a manner wherein energy applied to one of the other code buses would be effective to inhibit the picking up of the station registration relay.

Other objects, purposes, and characteristic features of the present invention will be in part obvious from the accompanying drawings and in part pointed out as the description of the invention progresses.

Figure 2A:
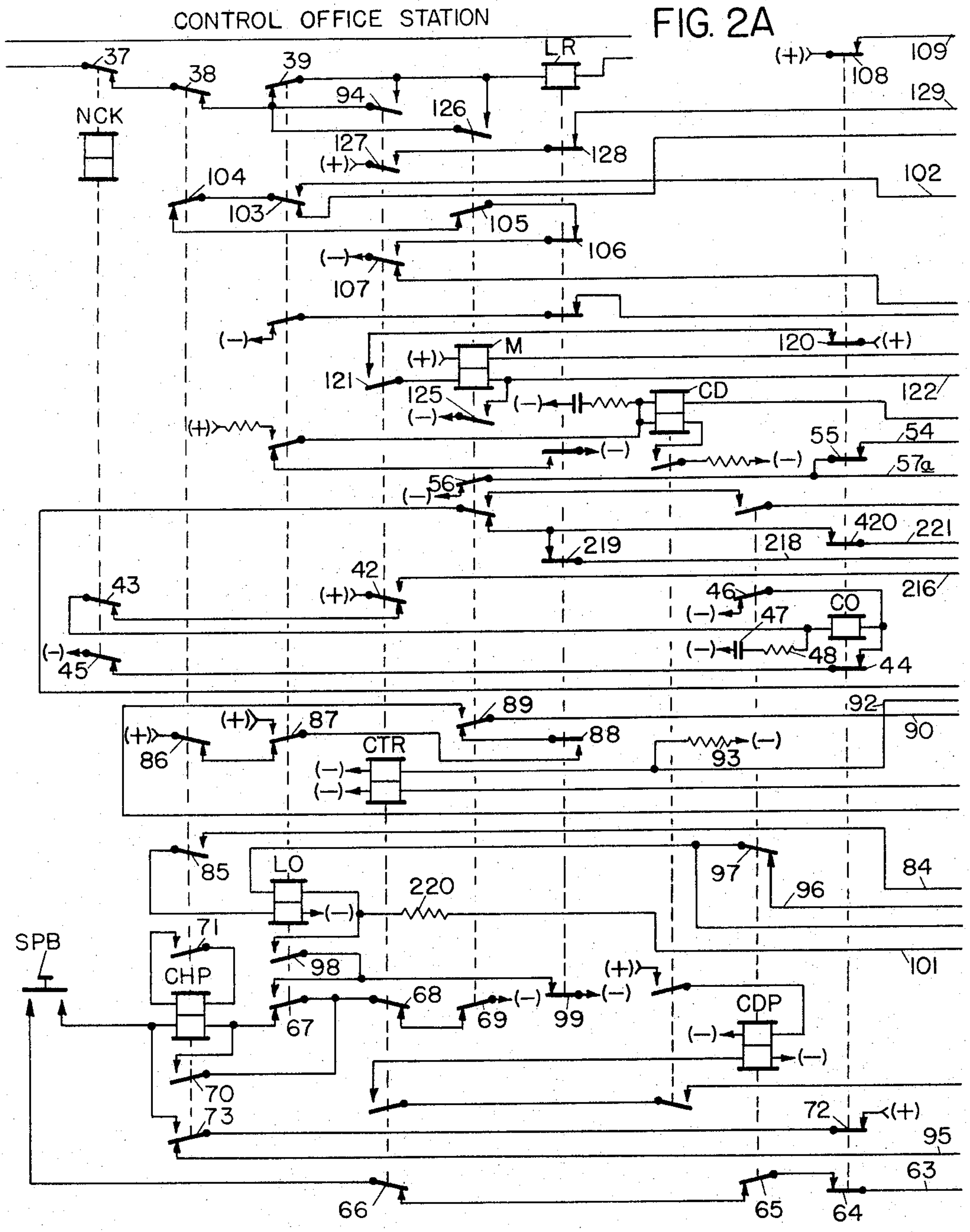
Figure 2B:
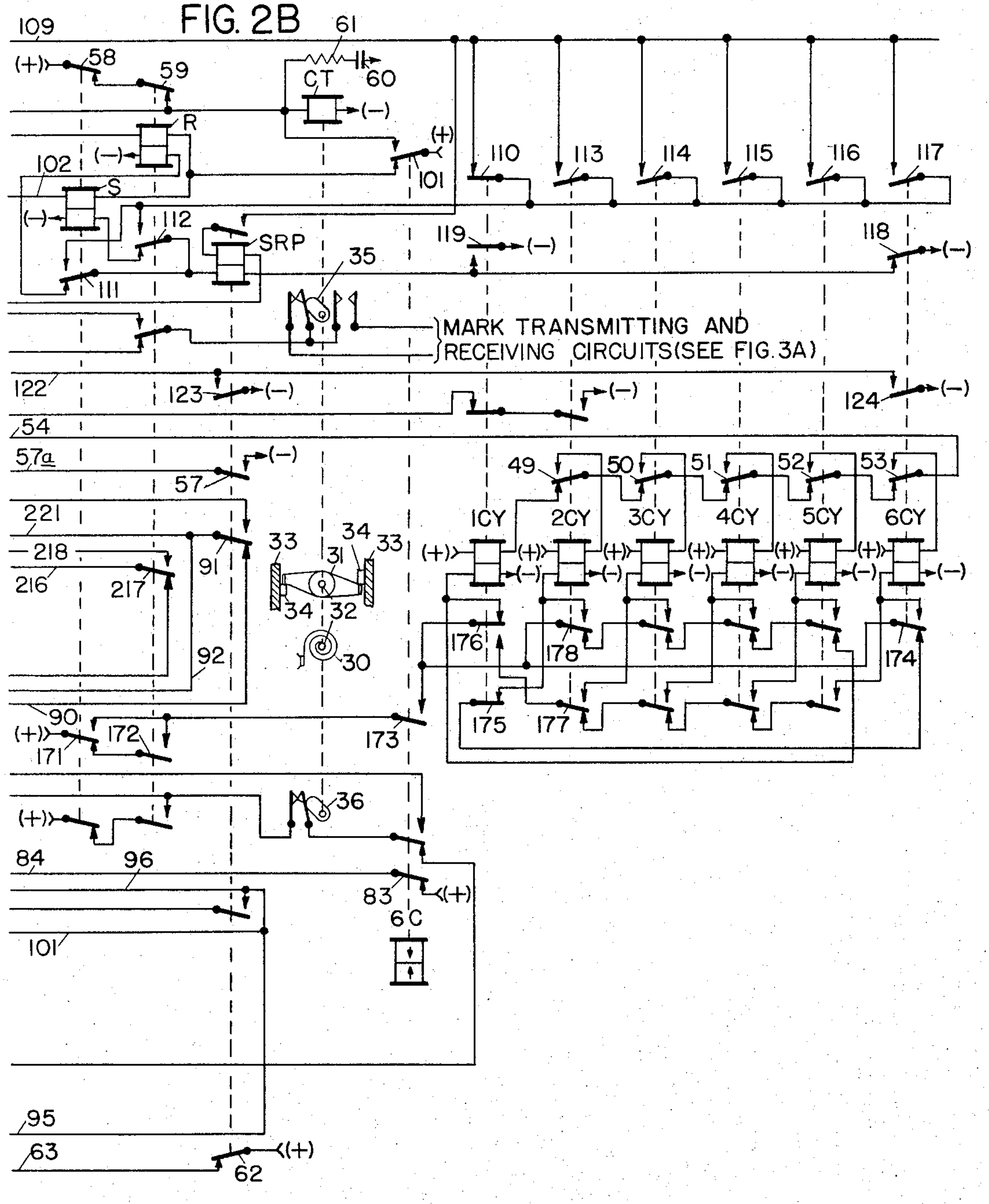
Figure 3A:
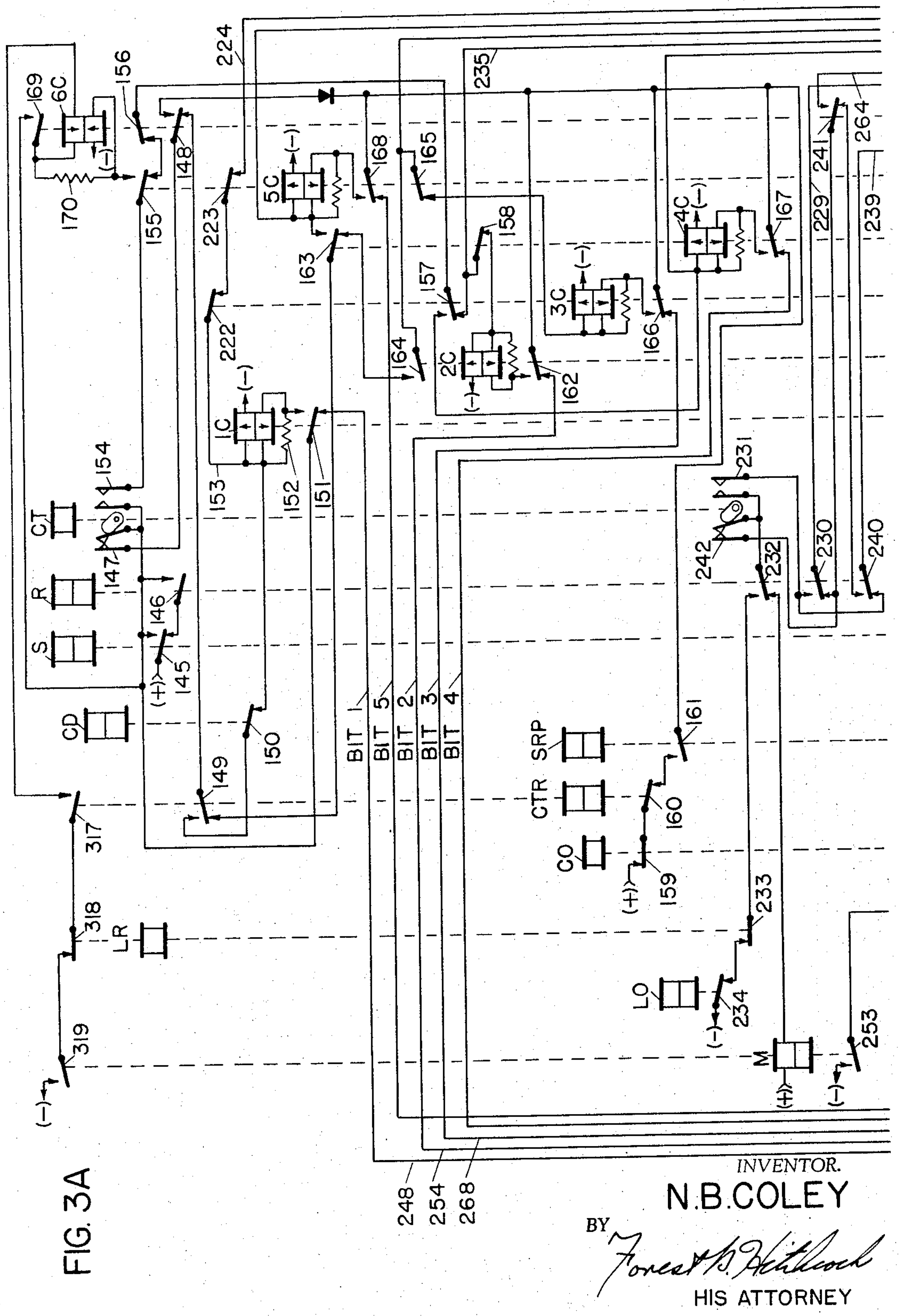
Figure 3B:
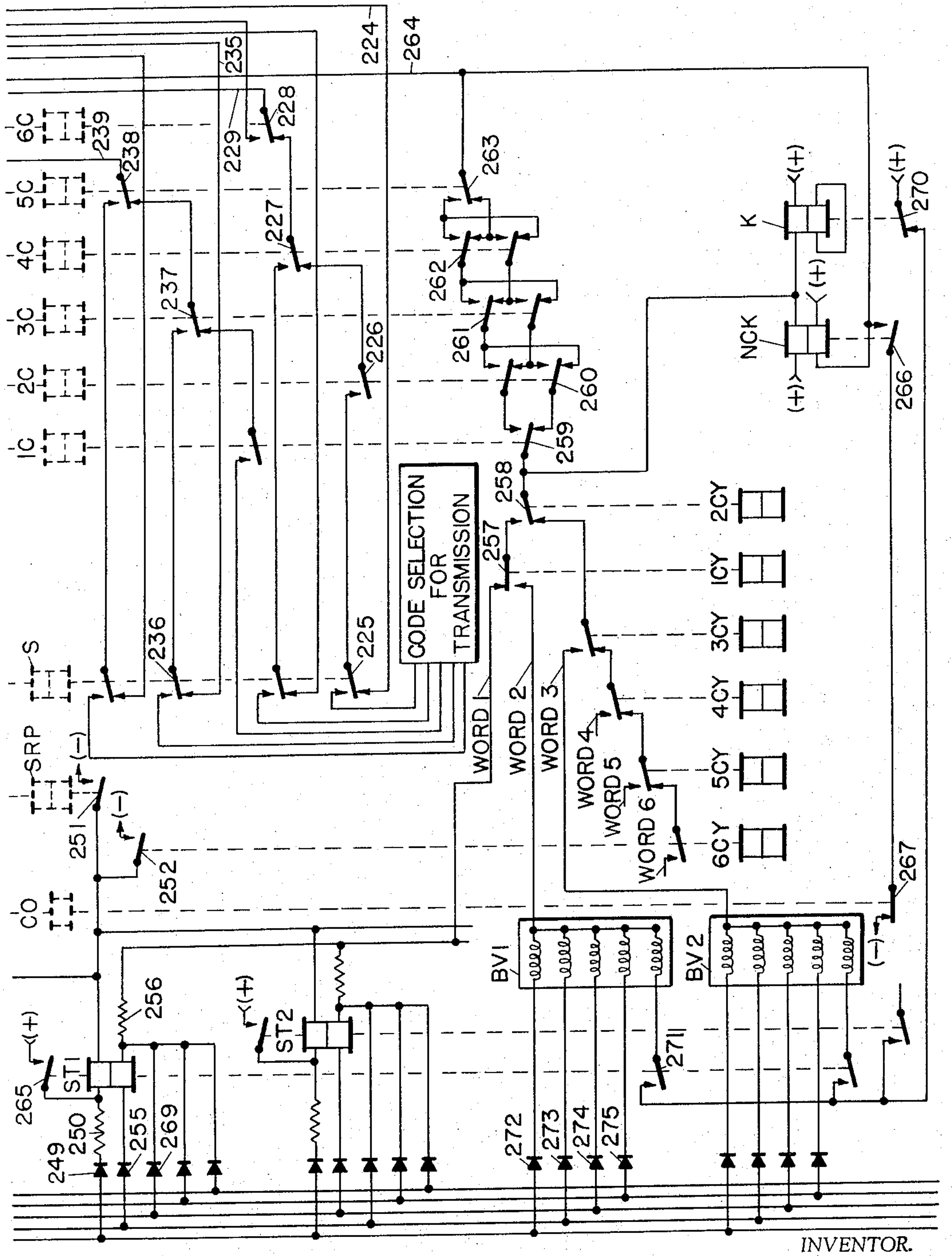
Figure 4A:
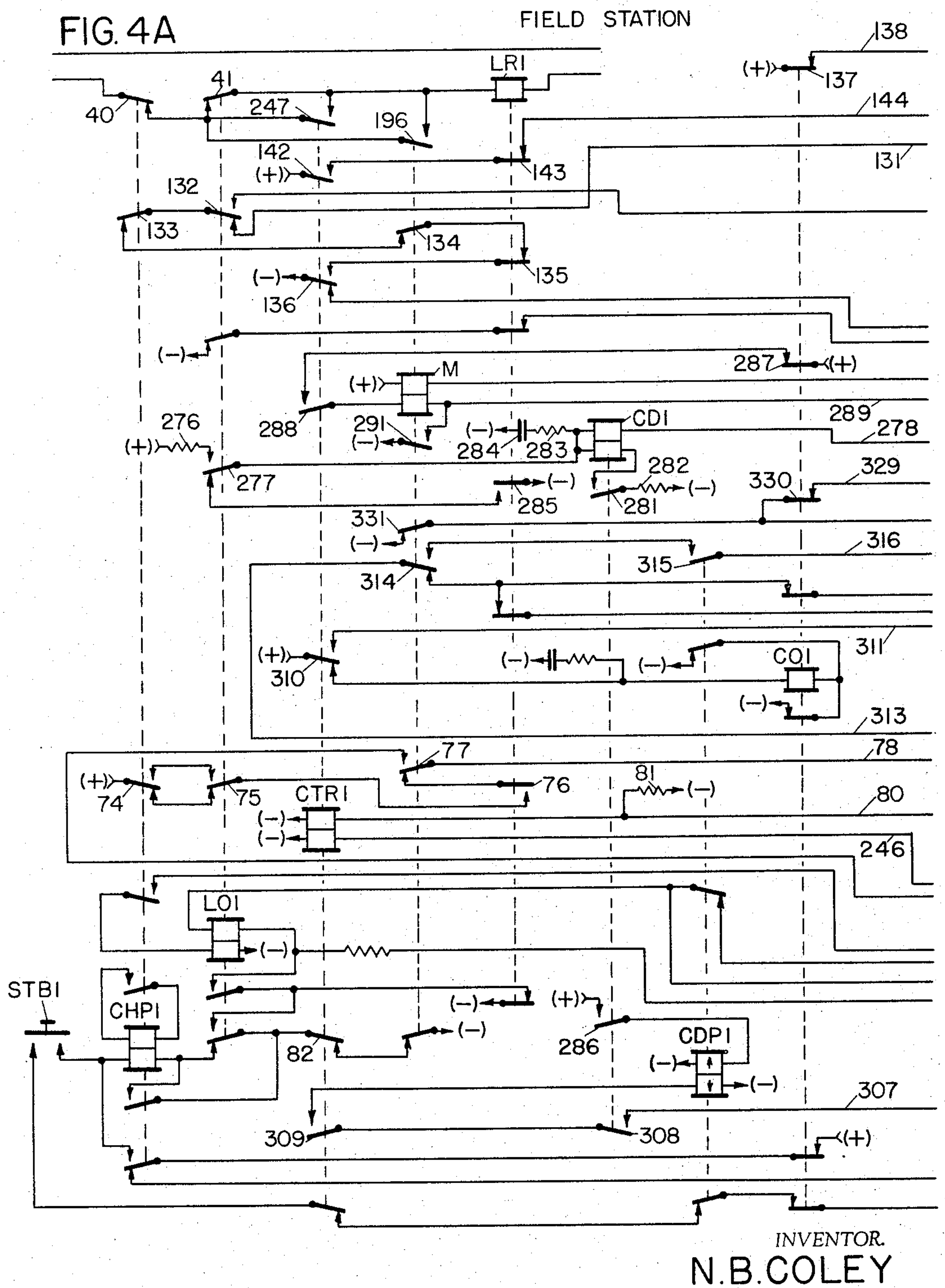
Figure 4B:
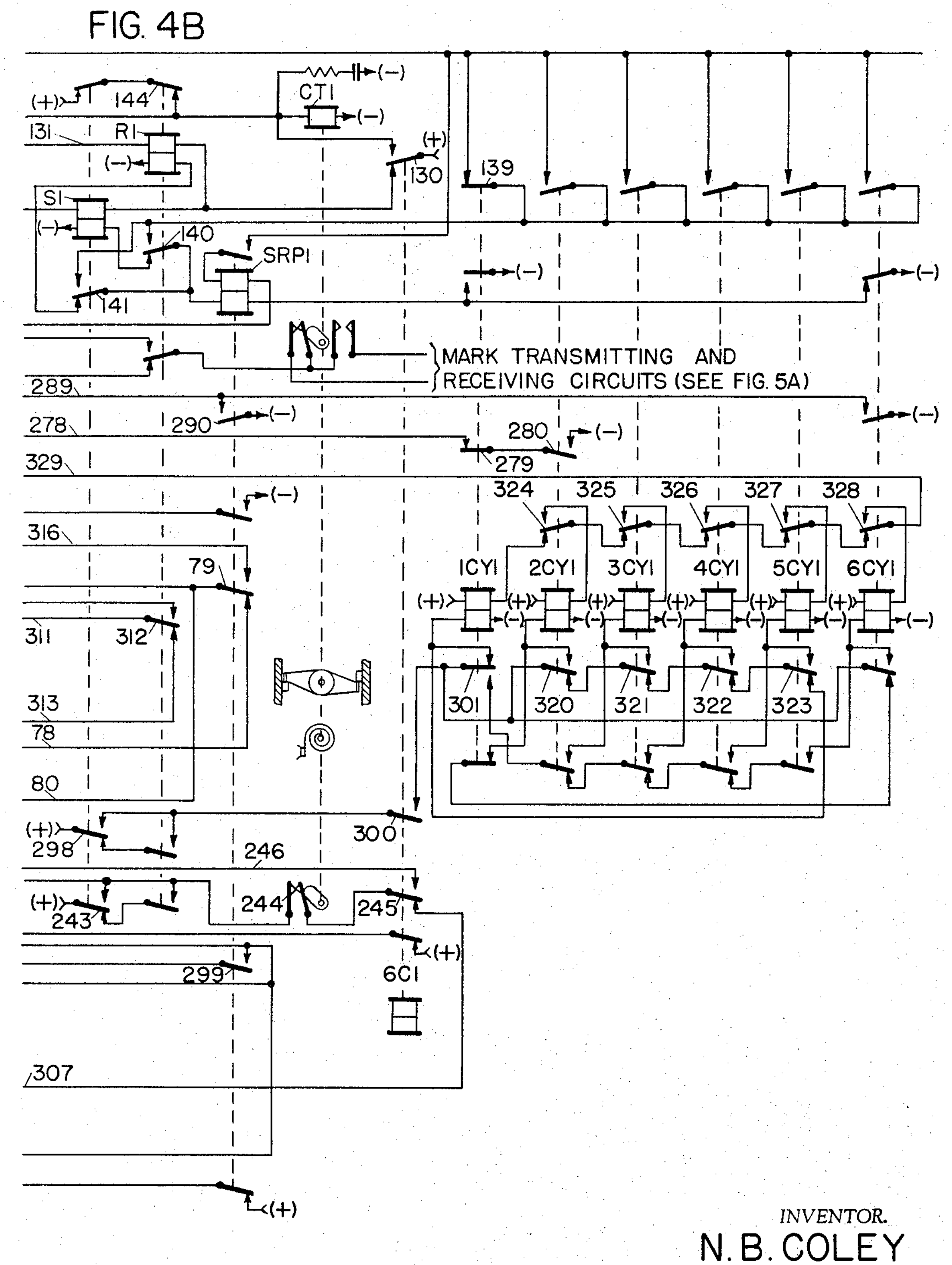
Figure 5A:
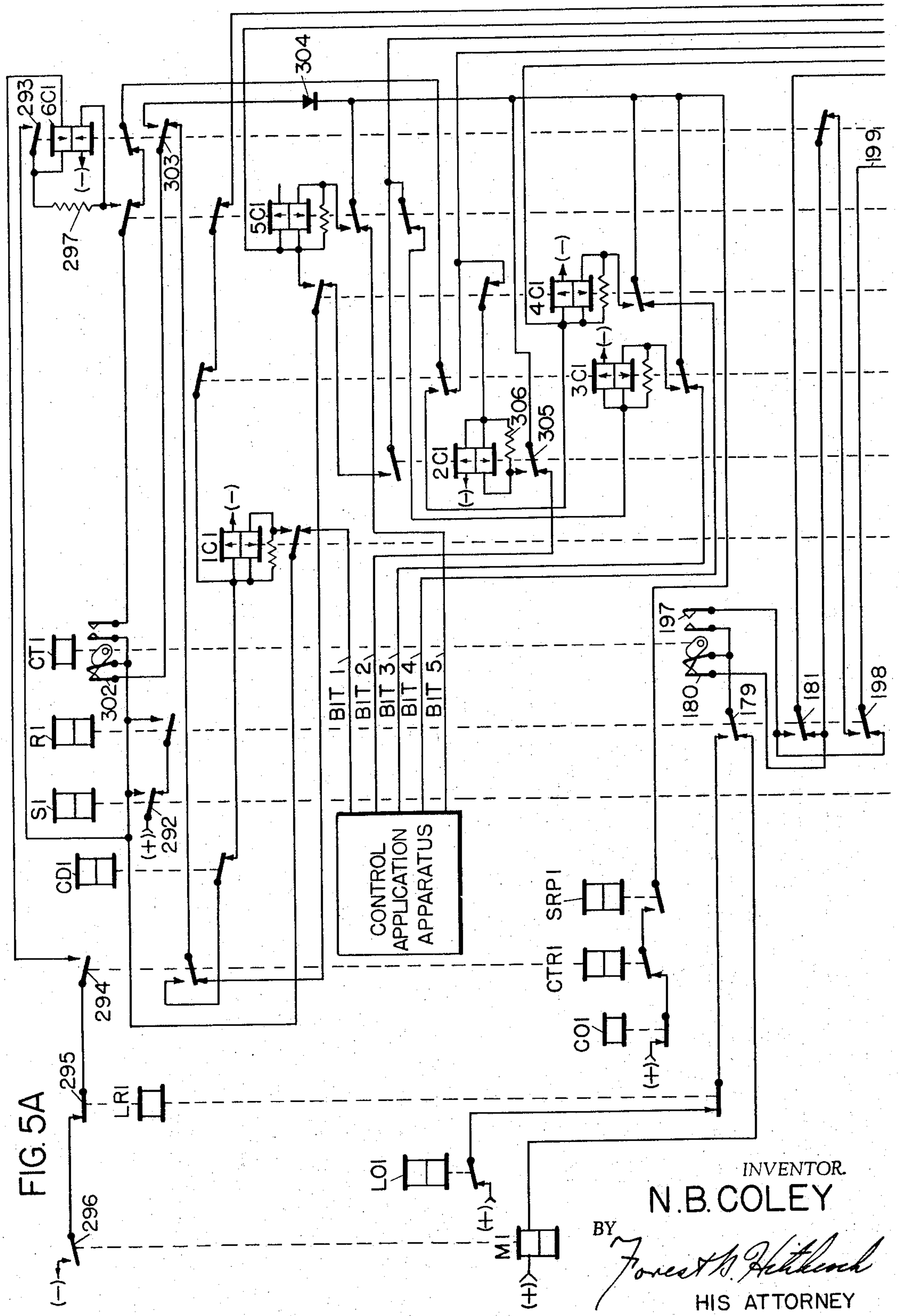
Figure 5B:
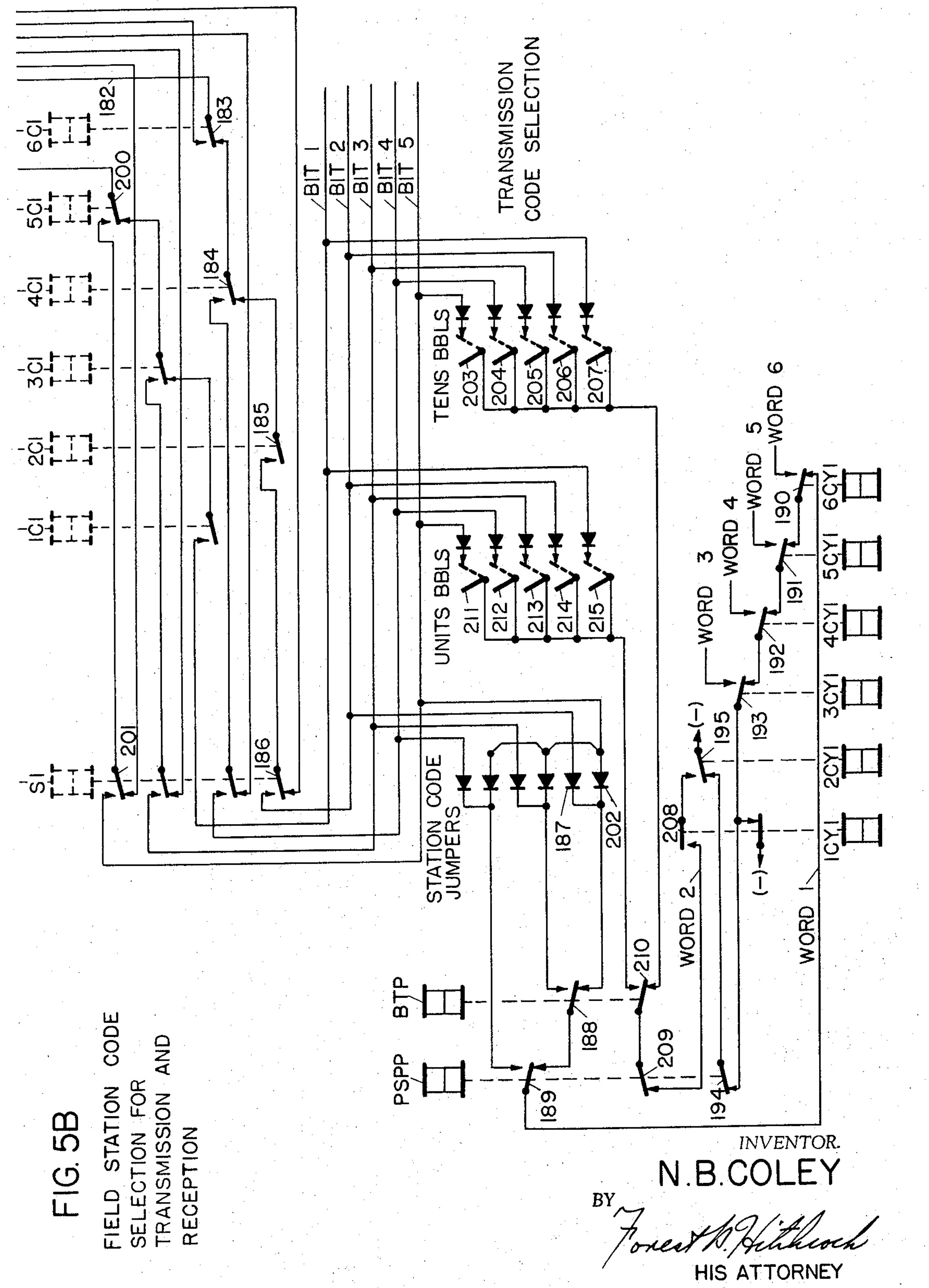
Figure 6A:
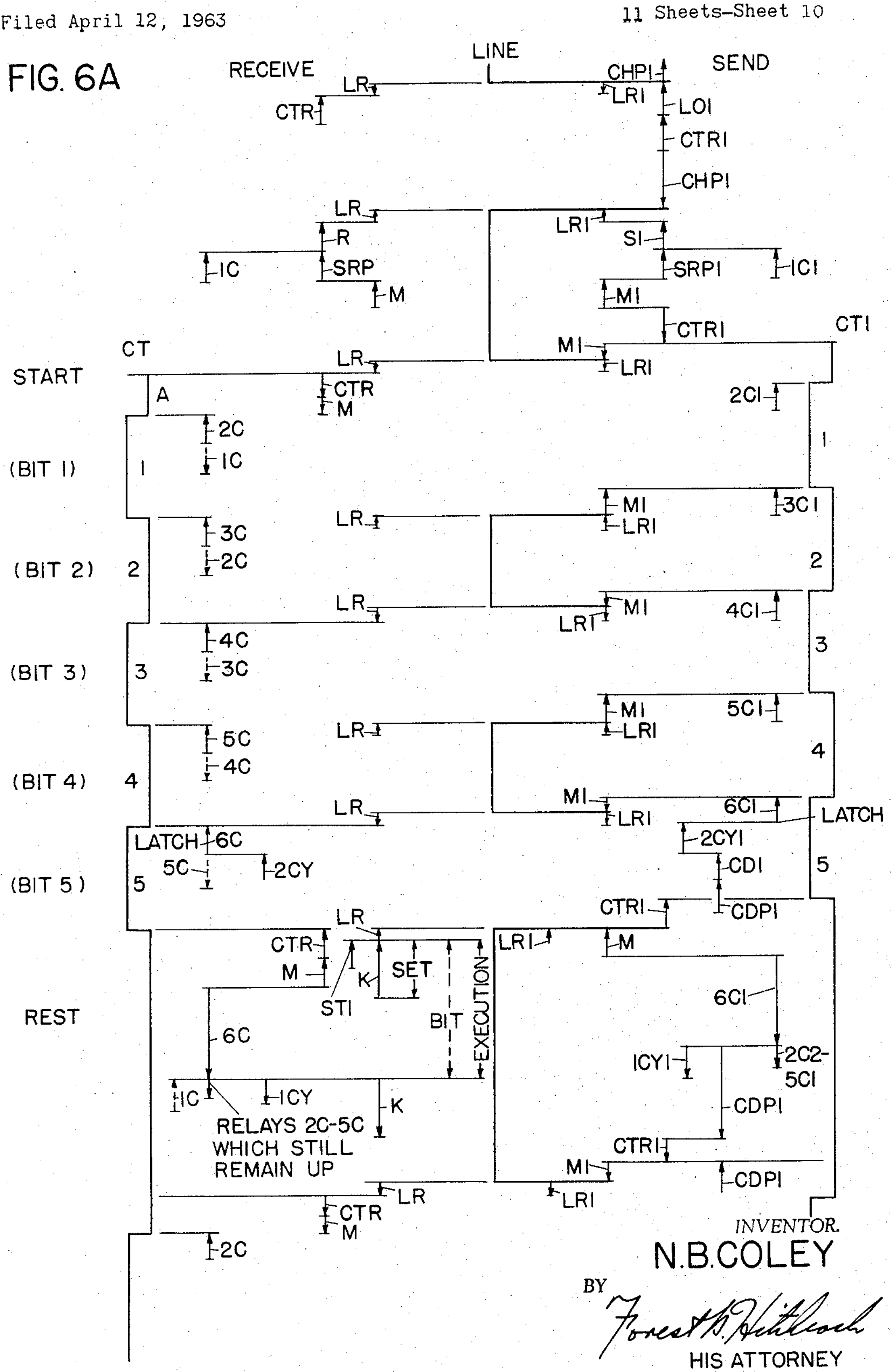
Figure 6B:
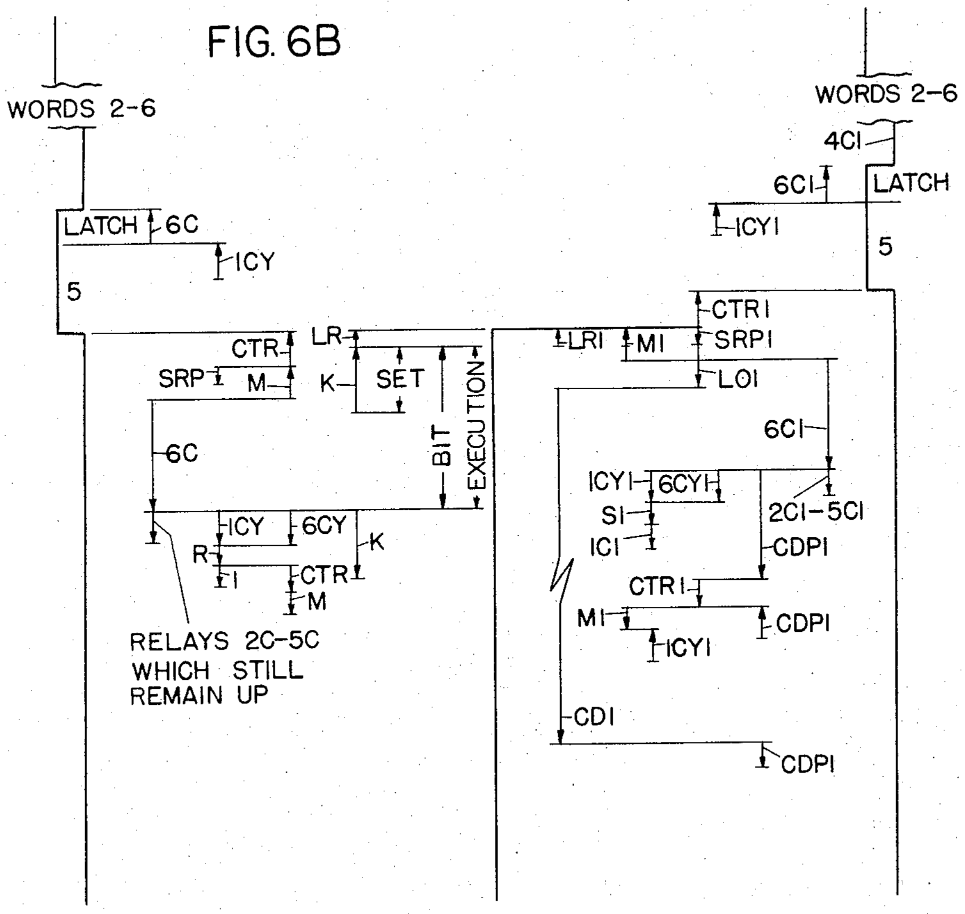

In describing the invention in detail, reference is made to the accompanying drawings in which corresponding parts are identified by similar reference characters and in which:

FIG. 1 is a circuit diagram of a line circuit and a block diagram of one embodiment of the present invention;

FIGS. 2A and 2B when placed side by side illustrate control office station transmitting and receiving apparatus for one embodiment of the present invention;

FIGS. 3A and 3B when placed one above the other illustrate counting and registration apparatus for the control office station;

FIGS. 4A and 4B when placed side by side illustrate transmitting and receiving apparatus for a typical field station;

FIGS. 5A and 5B when placed one above the other illustrate counting and code selection circuits for a typical field station; and FIGS. 6A and 6B when placed one above the other illustrate the sequence of operation of relays during a typical operating cycle.

The circuits have been illustrated by conventional schematic drawings, the organization of the drawings being such as to simplify the disclosure as to the principles of operation, rather than illustrating specifically the organization and arrangements of parts that may be employed in the practice of the present invention. The symbols (+) and (−) have been used to indicate connections to the respective positive and negative terminals of suitable batteries or other sources of direct current.

In the sequence charts of FIGS. 6A and 6B, arrows pointing respectively upwardly and downwardly are used to indicate the picking up and dropping away of the relays respectively. The lengths of the arrows can be considered as illustrating approximate relative times of operation for the respective relays. The vertical lines under the letters CT and CT1 respectively indicate the duration of closure of left hand and right hand contacts respectively of the code oscillators. The numerals appearing beside the lines relative to the code oscillators are indicative of the steps of a word in a cycle. The vertical lines at the center of the sequence chart indicate the mark and space periods of the line circuit.

With reference to FIG. 1, the block diagram of the system provided according to the present invention is shown wherein the communication channel is illustrated as including connections at a control office station and at each of a plurality of field stations. Part of this communication channel, including a line battery 10, and line wires 11 and 12, are shown dotted because these lines are intended to represent a conventional leased line circuit of the half duplex multi-point line type. This is effectively a series line circuit, and the line circuit at each of the stations must be closed in order for any of the line relays to be energized. The line circuit is shown in its normal condition wherein the system is normally inactive and the communication channel is closed and energized, and thus line relays LR are energized at all of the stations.

According to the block diagram of FIG. 1, the code communication apparatus at each of the stations is substantially the same, and the difference between the apparatus at the control office station and at the field stations is principally in the application circuits. Thus each station has Transmitting And Receiving Apparatus 13 which controls a normally inactive Step Timing Oscillator 14, which in turn controls a Step Counter 15 and the Step Counter 15 controls a Word Counter 16 for counting the words constituting a cycle of operation of the communicating system. Appratus is illustrated to provide Code Selection For Transmission 17 in accordance with control by the Word Counter 16 and Step Counter 15 at the associated station, and means is provided to Register And Store Indications Received 18 at the control office in accordance with selections made by the Word Counter 16 and Step Counter 15 at that station. Similar Control Application Apparatus 19 is provided at each of the field stations in that this is a two-way communication system.

A step timing oscillator CT (see FIG. 2B) at the control office and CT1 (see FIG. 4B) is provided at each field station for timing the steps of each cycle of operation of the communication system. Although many types of oscillators can be used for timing the stepping pulses, the oscillators used in this embodiment of the present invention are of the torsional pendulum type wherein the pendulum is locked in a wound up position normally, and is released when a cycle of operation is intiated so as to provide for a number of free oscillations sufficient to constitute a word of a communication cycle. Thus each oscillator CT has a torisonal spring 30 and a weighed pendulum 31 and a common shaft 32 which is free to oscillate torsionally when the magnetic structure 33 is deenergized so as to permit the torsional spring 30 to drive the pendulum away from stops 34. The shaft 32 carries cam 35 and 36 which actuate respective left and right hand groups of contacts. The left hand group of contact fingers are normally closed when the oscillator CT is in an energized condition. In operation of the oscillator, the left hand contacts are closed when the pendulum is rotated beyond its center position in a given direction, and the right hand contacts are closed when the pendulum is rotated beyond its center position in the opposite direction.

With reference to FIG. 3A, a bank of step counting relays 1C through 6C is provided at the control office for counting the steps measured by the oscillator CT. The relays 2C through 6C are used to count respectively the five bits of a word.

Each time the step counting relays complete their operation so as to actuate the relays 6C, a word counting relay CY is actuated in a bank of word counting relays shown in FIG. 2B including relays 1CY through 6CY.

With reference to FIG. 2B, a send relay S and a receive relay R are provided at the control office, together with a repeater relay SRP to selectively govern the sending and receiving operations.

Relays CHP, LO, CTR, M, CD, CDP and CO are provided for cycle control purposes as will be readily apparent as the description progresses.

It is to be understood that each of the field stations has similar apparatus to that which has been described, which is identified by similar letter reference characters that are made distinctive because of the addition of succeeding numerals.

Having thus considered the general organization of the apparatus in a code communication system according to one embodiment of the present invention, the circuit organization will be hereinafter more specifically described when considering the mode of operation of the system during typical operation conditions.

OPERATION

The apparatus of one embodiment of the present invention is illustrated in the drawings in conditions corresponding to the normal condition of the system wherein the code communication apparatus is normally inactive. Under these conditions, the line circuit is closed at each station, and thus the line relays LR at the control office station and LR1 at the respective field stations are normally in their picked up positions. The line circuit at the control office station is normally closed through back contact 37 of relay NCK (see FIG. 1), back contact 38 of relay CHP, back contact 39 of relay LO, and winding of line relay LR. Similarly, at field station No. 1 the line circuit is closed through back contact 40 of relay CHP1, back contact 41 of relay LO1, and winding of relay LR1.

With reference to FIG. 2A, the clear out relay CO is normally energized by a circuit including back contact 42 of relay CTR, back contact 43 of relay NCK, winding of relay CO, front contact 44 of relay CO, and back contact 45 of relay NCK. The back contact 46 of relay CDP also provides energy for the relay CO at this time. Relay CO is made slow to drop away by the connection across its winding of the capacitor 47 through resistor 48.

Relay 1CY (see FIG. 2B) is also normally energized to condition the apparatus for communication of the first word of a cycle. This relay is normally maintained energized by a circuit including the upper winding of relay 1CY, back contacts 49, 50, 51, 52 and 53 relays 2CY, 3CY, 4CY, 5CY and 6CY respectively, wire 54, front contact 55 of relay CO, and back contact 56 of relay M. Front contact 57 of relay SRP is connected in multiple with back contact 56 of relay M so as to maintain the relay 1CY energized during transmission or reception of the first word of a communication cycle.

The oscillator CT at the control office (see FIG. 2B) is energized under normal conditions, when the system is inactive, by a circuit including back contact 58 of relay S and back contact 59 of relay R. Oscillator CT has its winding shunted by a capacitor 60 through a resistor 61 to provide arc suppression.

Similarly, at each of the field stations, relays and control circuits are normally energized corresponding to the relays and control circuits that have been described in detail at the control office.

*Initiation of a cycle*

For consideration of the mode of operation upon initiation of a cycle, it will first be assumed that a cycle is initiated at the control office for sending a control code to one of the field stations. Such initiation is brought about by the actuation of the start button SPB (see FIG. 2A). This causes the picking up of the start relay CHP by the energization of a circuit including back contact 62 of relay SRP (see FIG. 2B), wire 63, front contact 64 of relay CO, back contact 65 of relay CDP, back contact 66 of relay CTR, push button SPB, lower winding of relay CHP, back contact 67 of relay LO, back contact of relay CTR, and back contact 69 of relay M. The upper winding of relay CHP is shunted through front contact 71 to provide slow release characteristics for relay CHP. Relay CHP is maintained picked up by a stick circuit including front contact 72 of relay CO, front contact 73 of relay CHP, lower winding of relay CHP, front contact 70 of relay CHP, back contact 68 of relay CTR, and back contact 69 of relay M.

The picking up of relay CHP initiates a first spacing period by opening the line circuit at back contact 38. Thus the picking up of relay CHP causes the dropping away of the line relay LR at the control office and causes the dropping away of the corresponding line relay such as relay LR1 (see FIG. 4A) at each of the field stations. At each station that does not have a start substantially simultaneously initiated, the relay CTR1 (see FIG. 4A) becomes picked up in response to the dropping away of the line relay LR1. Thus the relay CTR1 for field station No. 1, for example, becomes picked up in response to the dropping away of relay LR1 by the energization of a circuit including back contact 74 of relay CHP1, back contact 75 of relay LO1, back contact 76 of relay LR1, back contact 77 of relay M1, wire 78, back contact 79 of relay SRP1, wire 80, and upper winding of relay CTR1. The upper winding of relay CTR1 is shunted by a resistor 81 to make the relay slightly slow in dropping away. The picking up of the relay CTR1 at each of the field stations provides a lock out to prevent a subsequent cycle start from the associated station by opening the circuit for the start relay CHP1 at back contact 82.

At the control office station, the picking up of relay CHP causes the picking up of relay LO (see FIG. 2A) by the energization of a circuit including back contact 83 of relay 6C (see FIG. 2B), wire 84, front contact 85 of relay CHP, and lower winding of relay LO. The picking up of relay LO causes the picking up of relay CTR (see FIG. 2A) by the energization of a circuit including front contact 87 of relay LO, back contact 88 of relay LR, back contact 89 of relay M, wire 90, back contact 91 of relay SRP, wire 92 and upper winding of relay CTR. Relay CTR has a resistor 93 shunted across its upper winding to provide slightly slow drop away characteristics.

The picking up of relay CTR causes the dropping away of the relay CHP by opening its stick circuit at back contact 68. The dropping away of relay CHP closes the line circuit at back contact 38, this circuit being closed also through front contact 94 of relay CTR, the back contact 39 of relay LO being opened at this time.

The dropping away of relay CHP opens the circuit for relay LO at front contact 85, but the relay LO does not become dropped away because the line relay LR immediately picks up as has been described, and the picking up of this relay, with the relay CHP in its dropped away position establishes a circuit for maintaining relay LO energized. This circuit includes front contact 72 of relay CO, back contact 73 of relay CHP, wire 95, wire 96, back contact 97 of relay CDP, upper winding of relay LO, front contact 98 of relay LO, and front contact 99 of relay LR. The upper winding of relay LO is shunted through resistor 220, wire 101, wire 96, and back contact 97 so as to provide that this relay is slightly slow in dropping away to allow time for the establishment of its stick circuit as described, provided that the line relay LR is picked up immediately upon the dropping away of relay CHP. The timing of this circuit is such, however, as to permit the dropping away of relay LO in case the line relay LR does not become picked up immediately in response to the closure of the line circuit at that station by the back contact 38 of relay CHP.

If some other station has also substantially simultaneously attempted to start a cycle, and its start has been slightly later than the start that has been considered at the control office, the line circuit is still open at that station when the relay CHP at the control office station becomes dropped away to close its back contact 38. Under these conditions the relay LR at the control office station does not immediately become picked up because it is necessary that the line circuit be closed at all stations, and the station having started to transmit last has not yet closed the line circuits at that point. Under these conditions, the relay LO at the control office station becomes dropped away because of the failure to establish its stick circuit immediately upon closure of the line circuit at the control office. The dropping away of relay LO at the control office in this manner prevents the control office from initiating the cycle for the transmission of codes. The control office can be made superior, however, by making relay CHP slower to drop away.

Upon the picking up of the line relay LR at the control office, and assuming that the relay LO is maintained energized as has been described, the relay S (see FIG. 2B) becomes picked up by the energization of a circuit including back contact 101 of relay 6C, upper winding of relay S, wire 102, front contact 103 of relay LO, back contact 104 of relay CHP, back contact 105 of relay M, front contact 106 of relay LR, and front contact 107 of relay CTR. This relay is maintained energized until the end of the communication cycle by a stick circuit including front contact 108 of relay CO, wire 109, front contact 110, of relay 1CY, front contact 111 of relay S, back contact 112 of relay R, and lower winding of relay S. Front contacts 113, 114, 115, 116 and 117 of relays 2CY, 3CY, 4CY, 5CY and 6CY, respectively, are connected in multiple with front contact 110 of relay 1CY in the stick circuit for relay S to maintain this relay energized throughout the transmission of all six words constituting a communication cycle.

Relay SRP becomes picked up in response to the picking up of relay S by the energization of a circuit including front contact 108 of relay CO, (see FIG. 2A), wire 109, front contact 110 of relay 1CY, front contact 111 of relay S, lower winding of relay SRP and back contact 118 of relay 6CY. Back contact 119 of relay 1CY is connected in multiple with back contact 118 of relay 6CY in this circuit.

The picking up of relay SRP causes the picking up of relay M (see FIG. 2A) by the energization of a circuit including front contact 120 of relay CO, front contact 121 of relay CTR, lower winding of relay M, wire 122, and front contact 123 of relay SRP. Front contact 124 of relay 6CY is connected in multiple with front contact 123 of relay SRP. The picking up of relay M establishes a stick circuit at front contact 125 to shunt front contacts 123 and 124 of relays SRP and 6CY out of the circuit just described.

The closure of front contact 126 of relay M in the line circuit provides that the line circuit will be maintained closed after the dropping away of relay CTR. The relay CTR becomes dropped away in response to the picking up of relay M because of the opening of its circuit at back contact 89 of relay M. The relay CTR, in turn, causes the dropping away of relay M by opening its circuit at front contact 121, and the dropping away of relay M opens the line circuit at front contact 126 to cause the line relay LR to become dropped away and similarly to cause the line relays LR1 at all of the other stations to become dropped away.

The circuit that was described initially for maintaining the oscillator CT energized under normal conditions included back contact 58 of relay S which is picked up during the conditioning period of the cycle. The oscillator CT, however, is maintained energized until the dropping away of the relay CTR by circuit including front contact 127 of relay CTR (see FIG. 2A), front contact 128 of relay LR, wire 129, and winding of oscillator CT. The operation of the oscillator CT is thus initiated, under the conditions where the start of a cycle is initiated at the control office station by the dropping away of relay CTR.

Upon the picking up of the line relay LR1 at field station No. 1 and at each of the other field stations at the end of the initial line break period, the circuit is closed for the energization of the receive relay R1 including back contact 130 of relay 6C1 (see FIG. 4B), upper winding of relay R1, wire 131, back contact 132 of relay LO1, back contact 133 of relay CHP1, back contact 134 of relay M1, front contact 135 of relay LR1, and front contact 136 of relay CTR1. This relay is maintained energized by a stick circuit including front contact 137 of relay CO1, wire 138, front contact 139 of relay 1CY1, front contact 140 of relay R1, back contact 141 of relay S1, and lower winding of relay R1. Oscillator CT1 is maintained energized after the picking up of relay R1 by the energization of a circuit including front contact 142 of relay CTR1, (see FIG. 4A), front contact 143 of relay LR1, and wire 144.

The dropping away of the line relay LR1 as has been described upon termination of the mark that has been transmitted during the conditioning period of the cycle, opens the circuit for the oscillator CT1 at front contact 143 and thus initiates operation of the pulse timing oscillator at field station No. 1. Similarly the pulse timing oscillators CT1 at each of the other field stations is initiated by the deenergization of the line relay LR1 at that station.

Because of the oscillator CT at the control office having been started by the dropping away of the relay CTR prior to the deenergization of the line circuit at the end of the mark transmitted during the conditioning period, and because of the oscillators CT1 at the field stations being started in response to the dropping away of the line relays LR1 at such stations, the oscillators CT at the receiving stations are made to lag the oscillator CT at the transmitting station by the time of operation of the transmitting relay M plus the drop away time of the line relay LR1 and the propagation time.

*Step counting*

The step counting relays C are controlled by the oscillators CT at the associated stations. The five bits of a code are counted by the relays 2C through 6C, the relay 1C being picked up during the conditioning period prior to the start of transmission of a word. The relay 1C is picked up in response to the picking up of the send relay S at the transmitting station, and the corresponding relay 1C1 is picked up in response to the picking up of the receive relay R1 at each receiving station during the conditioning period.

With reference to FIG. 3A, the pick up circuit for relay 1C includes front contact 145 of relay S, connected in multiple with front contact 146 of relay R, left hand contact 147 of oscillator CT, back contact 148 of relay 6C, front contact 149 of relay CTR, back contact 150 of relay CD, and upper winding of relay 1C. Upon the picking up of relay 1C, a stick circuit is closed for this relay including front contacts 145 and 146 of relays S and R respectively in multiple, front contact 151 of relay 1C, and windings of relay 1C in series. A multiple path for the upper winding of relay 1C is established through resistor 152 whereby the upper winding of relay 1C is energized with substantially greater current than the lower winding. The lower winding of relay 1C is a drive down winding, and thus the relay 1C is maintained energized by differential energization of the relay in that both its pick and drive down windings are energized, but a greater amount of current flows in the pick up winding.

When the pendulum of the oscillator CT swings through its center position for its first excursion during the cycle, the contact 147 of oscillator CT is opened, and the contact 154 is closed. This operation provides for the picking up of the relay 2C to count the first bit of a five-bit code. The circuit by which relay 2C is energized under these conditions includes front contact 145 of relay S, contact 154 of oscillator CT, back contact 155 of relay 5C, back contact 156 of relay 6C, back contact 157 of relay 3C, back contact 158 of relay 4C, and upper winding of relay 2C. Stick energy is provided to maintain relay 2C in its picked up position in a circuit including front contact 159 of relay CO, back contact 160 of relay CTR, front contact 161 of relay SRP, front contact 162 of relay 2C, and the pick up and drive down windings of relay 2C connected in series.

When the pendulum of the timing oscillator CT passes through its center position for the second time during the transmission of a word, the relay 3C becomes picked up to count the second step by the energization of a circuit including front contact 145 of relay S, contact 147 of oscillator CT, back contact 148 of relay 6C, back contact 149 of relay CTR, back contact 163 of relay 4C, front contact 164 of relay 2C, back contact 165 of relay 5C, and upper winding of relay 3C. The relay 3C is maintained picked up by stick circuit including front contact 159 of relay CO, back contact 160 of relay CTR, front contact 161 of relay SRP, front contact 166 of relay 3C, and pick up drive down windings of relay 3C connected in series.

The next time the pendulum of oscillator CT rotates through its center position, the relay 4C is picked up to count the third step. The circuit for the energization of relay 4C includes front contact 145 of relay S, contact 154 of oscillator CT, back contact 155 of relay 5C, back contact 156 of relay 6C, front contact 157 of relay 3C, and upper winding of relay 4C. The picking up of this relay establishes a stick circuit to maintain relay 4C energized including front contact 159 of relay CO, back contact 160 of relay CTR, front contact 161 of relay SRP, front contact 167 of relay 4C, and pick up and drive down windings of relay 4C connected in series.

The next time the pendulum of oscillator CT rotates through it s center position, the relay 5C becomes picked up to count the fourth step upon the energization of a circuit including front contact 145 of relay S, contact 147 of oscillator CT, back contact 148 of relay 6C, back contact 149 of relay CTR, front contact 163 of relay 4C, and upper winding of relay 5C. This relay is maintained energized by a stick circuit including front contact 159 of relay CO, back contact 160 of relay CTR, front contact 161 of relay SRP, front contact 168 of relay 5C, and pick up and drive down windings of relay 5C connected in series.

The next time the pendulum of the oscillators CT rotates through its center position, the relay 6C becomes picked up to count the fifth step in accordance with the energization of a circuit including front contact 145 of relay S, contact 154 of oscillator CT, front contact 155 of relay 5C, and lower winding of relay 6C. Relay 6C is maintained picked up by the energization of a stick circuit including front contact 145 of relay S, front contact 169 of relay 6C, resistor 170, and lower winding of relay 6C. The picking up of relay 6C completes the counting of the five bits of a word.

It is to be understood that the counting relays C1 at each of the field stations are similarly controlled. When a station is receiving, the counting relays C at that station are selectively driven down to register the code received after they have performed their counting function. This mode of operation will be hereinafter considered.

*Word counting*

With reference to FIG. 2B, the word counting relays 1CY through 6CY are successively operated to count the respective words of a cycle of operation, the relay 1CY being normally energized as has been described and being maintained picked up throughout the transmission of the first word.

Upon the picking up of the step counting relay 6C at the beginning of the fifth step at the end of the first word, a circuit is closed to energize the relay 2CY for counting the second word of the cycle. The circuit by which relay 2CY is picked up includes front contact 171 of relay S, connected in multiple with front contact 172 of relay R, front contact 173 of relay 6C, back contact 174 of relay 6Y, front contact 175 of relay 1CY and lower winding of relay 2CY. Relay 1CY is not dropped away until the relay 6C is dropped away because it is energized by a stick circuit including front contact 171 of relay S, front contact 173 of relay 6C, front contact 176 of relay 1CY, and lower winding of relay 1CY. Because of relay 1CY being maintained energized as long as the relay 6C is maintained picked up, the relay 3CY cannot be energized until the relay 6C is picked up at the end of the second word. Relay 2CY is maintained picked up throughout the transmission of the second word by a stick circuit including the upper winding of relay 2CY, front contact 49 of relay 2CY, back contacts 50, 51, 52 and 53 of relays 3CY, 4CY, 5CY and 6CY respectively, wire 54, front contact 55 of relay CO, wire **57*a* and front contact 57** of relay SRP.

Upon the picking up of relay 6C at the end of the second word, the relay 3CY becomes picked up by the energization of a circuit including front contact 171 of relay S, front contact 173 of relay 6C, back contact 176 of relay 1CY, front contact 177 of relay 2CY, and lower winding of relay 3CY. Relay 2CY is maintained picked up after the opening of its stick circuit for its upper winding at back contact 50 of relay 3CY by a stick circuit for its lower winding including front contact 171 of relay S, front contact 173 of relay 6C, front contact 178 of relay 2CY, and lower winding of relay 2CY. Relay 3CY is maintained energized by a stick circuit similar to that which has been described for relay 2CY. The relay 2CY becomes dropped away upon the opening of the stick circuit for its lower winding at front contact 173 of relay 6C, when that relay is dropped away at the end of the second word.

From the mode of operation as has been described specifically relative to the control of the relays 1CY, 2CY and 3CY, it will be readily apparent that one word counting relay is maintained picked up throughout the transmission of the corresponding word, and is dropped away upon the dropping away of relay 6C, at the end of the associated word and after a relay CY has been picked up for the next following word.

Word counting relays at each of the other stations are operated during a communication cycle in a similar manner. For example, the relays 1CY1 through 6CY1 (see FIG. 4B) at fiield station No. 1 are controlled in the same manner as has been heretofore described relative to corresponding relays at the control office station.

*Message transmission*

For consideration of the mode of operation of the system upon message transmission, it will be assumed that acycle of operation has been initiated by field station No. 1 for the transmission of a message to the receiving station at the control office. The initiation of such a cycle of operation is in accordance with the mode of operation as it has been described in detail relative to a start by the control office.

The send relay S1 (see FIG. 4B) is picked up at field station No. 1 and the receive relay R at the control office is picked up during the conditioning period at the beginning of the cycle. As has been heretofore pointed out, the first word transmitted during a cycle is a station code, and for consideration of a typical cycle, with reference to FIG. 5B, it will be assumed that the station code is elected in accordance with station selecting relays PSPP and BTP being in their dropped away positions. This selects the transmission of the station code "space-mark-space-space-mark."

The first code bit is a space because the relay M has no energizing circuit closed during the first step.

The second character of the code is a mark because the relay M becomes picked up by the energization of a circuit including upper winding of relay M1, (see FIG. 5A), back contact 179 of relay R1, contact 180 of oscillator CT1, back contact 181 of relay R1, wire 182, back contact 183 of relay 6C1, back contact 184 of relay 4C1, front contact 185 of relay 2C1, front contact 186 of relay S1, diode 187, back contact 188 of relay BTP, back contact 189 of relay PSPP, back contacts 190, 191, 192 and 193 of relays 6CY1, 5CY1, 4CY1 and 3CY1 respectively, back contact 194 of relay PSPP, and back contact 195 of relay 2CY1.

The picking up of relay M1 under these conditions closes the line circuit at front contact 196 (see FIG. 4A), for the transmission of a mark during the second step.

This relay is dropped away at the end of the second step in accordance with the opening of contact 180 of oscillator CT1 when the pendulum of that oscillator rotates through its center position. The dropping away of relay M1 opens the line circuit at front contact 196 (see FIG. 4A), and thus a space character is transmitted as the third character, and in accordance with the code under consideration, the fourth step will also transmit a space character.

The relay M1 is picked up at the beginning of the fifth step for the transmission of a mark character in accordance with the energization of its upper winding through back contact 179 of relay R1, contact 197 of oscillator CT1, back contact 198 of relay R1, wire 199, front contact 200, of relay 5C1, front contact 201 of relay S1, diode 202, back contact 188 of relay BTP, back contact 189 of relay PSPP, back contacts 190, 191, 192 and 193 of relays 6CY1, 5CY1, 4CY1 and 3CY1 respectively, back contact 194 of relay PSPP and back contact 195 of relay 2CY1.

The code to be transmitted during the second word of a cycle of operation of the code communication system is determined in accordance with the station for which the cycle is intended as determined by the code transmitted during the first word. Thus, for example, if the relays PSPP and BTP of FIG. 5B are both in their dropped away positions during this cycle for the selection of a particular station code, it is determined that the code transmitted during the second word is in accordance with the condition of coding devices indicative of a measure of a digit in the number of barrels of oil, for example. This code, in practice, is generally determined by counting relays and the like, but for the purpose of the present invention, the code is illustrated as being determined by switches 203 through 207 which can be positioned independently in accordance with the code intended to be transmitted during the second word of the cycle.

The relay M1 is selectively energized during the different steps for the transmission of mark and space characters as selected by these switches in a manner similar to that which has been described when considering the transmission of a code during the first word of the cycle. Negative energy is connected to the contacts 203 through 207 of the barrel indicating switches through front contact 195 of relay 2CY1, back contact 208 of relay 1CY1, back contact 209 of relay PSPP and back contact 210 of relay BTP. It will be noted that the switches 203 through 207 selectively apply energy during the respective steps to a set of busses corresponding to buses that have been heretofore described as being used for the selective energization of the mark transmission relay M.

Similarly, if another station is selected for transmission at field station No. 1 during the second word in accordance with the picking up of the station relay BTP, for example, the closure of its front contact 210 selects a bank of units barrels code switches 211 through 215 to be used to select the energization of the mark relay M1 during the respective steps of the second word of the cycle. It is also to be under stood that the control of transmission during the second word is typical of circuits that can be provided for transmission during subsequent words of the cycle, the selection of codes for the words 3, 4, 5 and 6 being made through front contacts 193, 192, 191 and 190 of relays 3CY1, 4CY1, 5CY1 and 6CY1 respectively. It is also to be understood that a larger or smaller number of words can be transmitted by adding or deleting respectively word counting relays CY1.

*Message reception*

To consider the mode of operation upon message reception, it will be assumed that a cycle of operation is transmitted by one of the field stations in a manner which has been described wherein a station registration code is transmitted as the first word and an indication such as of the number of barrels of oil is transmitted during the second word of the cycle. The control office station is conditioned during the conditioning period for the reception of codes in a manner comparable to that which has been described under the heading of initiation of the system. During this conditioning, the relays R, and SRP are picked up in a manner comparable to that which has been described for the energization of corresponding relays at field station No. 1 when that station was considered as being a receiving station. Relay 1C is picked up in response to the picking up of the relay R and relay M is picked up in response to the picking up of the relay SRP, all in a manner which has been heretofore described. The relay CTR (see FIG. 2A) has been picked up at the beginning of the cycle in accordance with the dropping away of the line relay LR. The circuit by which the relay CTR has been picked up includes back contact 86 of relay CHP, back contact 97 of relay LO, back contact 88 of relay LR, back contact 89 of relay M, back contact 91 of relay SRP, and upper winding of relay CTR. This relay is held up by a stick circuit which is closed at the beginning of the mark that is transmitted during the conditioning period and before the picking up of relays R and SRP. This stick circuit includes front contact 42 of relay CTR, wire 216, front contact 217, of relay R, wire 218, front contact 219 of relay LR, front contact 420 of relay CO, wire 221, wire 92, and upper winding of relay CTR. This circuit is maintained closed until it is opened at front contact 219 of relay LR upon termination of the mark that is transmitted during the conditioning period.

In response to the picking up of the counting relay 2C (see FIG. 3A) during the first step, the relay 1C becomes selectively driven down or is maintained picked up in accordance with whether a mark or a space character is received during the first step. If a mark is received during the first step, a drive down circuit is closed for the lower winding of relay 1C upon the picking up of relay 2C including back contact 145 of relay S, front contact 146 of relay R, front contact 151 of relay 1C, lower winding of relay 1C, back contact 222 of relay 3C, back contact 223 of relay 5C, wire 224, back contact 225 of relay S, front contact 226 of relay 2C, back contact 227 of relay 4C, back contact 228 of relay 6C, wire 229, front contact 230 of relay R, contact 231 of oscillator CT, front contact 232 of relay R, front contact 233 of relay LR, and back contact 234 of relay LO. The closure of this circuit shunts the upper winding of relay 1C and provides a higher degree of energization of the drive down winding because of the upper winding being shunted, while the drive down winding has been energized in series with the upper winding prior to this time. It will be noted that the energization of this drive down circuit has been dependent upon the closure of front contact 233 of the line relay LR, and thus relay 1C is driven down during the first step only provided that the line relay is energized and thus is dependent upon the reception of a mark character. If a space character is transmitted during this step, the relay 1C is maintained in its picked up position.

In response to the picking up of the counting relay 3C during the second step, the relay 2C becomes selectively driven down or is maintained picked up in accordance with whether a mark or a space character is received during that step. If a mark is received during the second step, a drive down circuit is closed for the lower winding of relay 2C upon the picking up of relay 3C including front contact 159 of relay CO, back contact 160 of relay CTR, front contact 161 of relay SRP, front contact 162 of relay 2C, lower winding of relay 2C, back contact 158 of relay 4C, wire 235, back contact 236 of relay S, front contact 237 of relay 3C, back contact 238 of relay 5C, wire 239, front contact 240 of relay R, back contact 241 of relay 6C, contact 242 of oscillator C, front contact 232 of relay R, front contact 233 of relay LR, and back contact 234 of relay LO. If the line relay LR is not in its picked up position at this time, the drive down circuit just described cannot be closed, and thus the relay 2C is maintained in its picked up position to register the reception of a space character during the second step.

Similarly, during each of the subsequent steps, the counting relay for the prior step is selectively driven down or maintained picked up in accordance with whether a mark or a space character is received, thus providing a means for registering and storing the code received during the word in accordance with the condition of the relays 1C through 5C.

*Execution*

With reference to the sequence chart of FIGS. 6A and 6B, it will be noted that an execution period is provided at the end of each word, and it is initiated by the termination of the fifth step, during which the last bit of the code of the word is received. At this time, a station relay becomes picked up in accordance with the code that is stored by the counting relays 1C through 5C. Two of the station relays have been illustrated in FIG. 3B as relays ST1 and ST2. The relay ST1 requires the first and second characters of the word to be marks and the other three characters to be spaces in order to be picked up, and the station relay ST2 requires that marks be received as bits 1 and 3 and that the remaining bits of the word be spaces in order to be picked up. These relays are energized directly from code receiving buses for the respective bits of the code received, each relay having two windings, and these windings being connected to the buses in such a manner that they are energized by the two marks that are received for the particular code belonging to such station relays. Both windings of these station relays must be energized at the same time in order for the relay to be actuated to its picked up position.

If a mark is received as the first bit of a code for the first word of a communication cycle, the station relay ST1 is energized during the execution period by a circuit including back contact 145 of relay S, front contact 146 of relay R, back contact 151 of relay 1C, wire 248, diode 249, resistor 250, upper winding of relay ST1, and front contacts 251, 252 and 253 of relays SRP, 6CY, and M connected in multiple. The front contact 251 of relay SRP is the contact of this group that is closed at this time. If a mark is received as the second bit of a code for the first word, the relay ST1 is also energized by a circuit including front contact 159 of relay CO, back contact 160 of relay STR, front contact 161 of relay SRP, back contact 162 of relay 2C, wire 254, diode 225, lower winding of relay ST1, resistor 256, front contact 257 of relay 1CY, front contact 258 of relay 2CY, back contact 259 of relay 1C, back contact 260 of relay 2C, front contact 261 of relay 3C, front contact 262 of relay 4C, front contact 263 of relay 5C, wire 264, front contact 241 of relay 6C, contact 242 of oscillator CT, front contact 232 of relay R, front contact 233 of relay LR, and back contact 234 of relay LO. It will be noted that this circuit includes a parity check of the conditions of all of the counting relays to check that there is a storage of a code having two marks out of five characters. Also in accordance with this parity check and by the energization of a portion of the same circuit that has been described, including the parity check contacts, the relay K is picked up to indicate that the code has had a parity check.

Relay NCK is picked up if there is no parity by the energization of its lower winding from wire 264. The two windings of relay NCK are connected in opposition, and, if there is a proper parity check circuit established, both upper and lower windings are energized at the same time, thus causing no actuation of the relay. Should the circuit through the upper winding of relay NCK and the parity check logic be open when the lower winding of relay NCK becomes energized, relay NCK becomes picked up to register the abnormal condition.

It will be noted that the circuit organization for the control of the station relay ST1 (see FIG. 3B), for example, is such that if an erroneous code is received wherein marks are received on the first and second bits of the code as has been described, and in addition an extraneous mark is received as another bit of the code for the station registration word, a circuit is closed to effectively shunt the lower winding of relay ST1, and thus prevent the picking up of that relay even though an energizing circuit is provided for each of its windings by circuits that have been described. This shunt would be applied if a mark were received as the third bit of the code in addition to marks for the first and second bits by the energization of a circuit including front contact 159 of relay CO (see FIG. 3A), back contact 160 of relay CTR, front contact 161 of relay SRP, back contact 166 of relay 3C, wire 268, and diode 269 to the right hand terminal of the lower winding of relay ST1. It will be noted that this check on the integrity of the code is in addition to the parity check which is included in the circuits for the lower windings of the station relays ST.

The code received during the second word of the cycle is for the control of a device which is associated with the particular station that has been registered by the picking up of a station relay ST1, ST2, etc. at the end of the first word. The code received during the second word is stored by selectively conditioning the counting relays 1C through 5C in a manner similar to that which has been described as being effective during the first word, and an execution period is provided at the end of the second word comparable to the period that has been described as being provided at the end of the first word.

It has been illustrated in FIG. 3B that a binary indicating device BV1 is controlled in accordance with the code registered on the relays 1C through 5C at the end of the second word. This binary device may be of any suitable type, but for the purpose of illustration in one embodiment of the present invention it is considered to be a binary posting indicator having decoding means and a set winding which must be energized before the indicator can be actuated in accordance with the code that is received. This set winding is energized at the beginning of the execution period at the end of a word and before the relay K has time to be picked up as is indicated in the sequence chart of FIGS. 6A and 6B.

The indicator BV1 has its set winding energized at the beginning of the execution period at the end of the second word by the energization of a circuit including back contact 270 of relay K, front contact 271 of relay ST1, set winding of indicator BV1, back contact 257 of relay 1CY, front contact 258 of relay 2CY, through the parity checking circuit organization including contacts of relays 1C through 5C, wire 264, front contact 241 of relay 6C, contact 242 of oscillator CT, front contact 232 of relay R, front contact 233 of relay LR, and back contact 234 of relay LO. After the set winding has been energized, the relay K becomes picked up by the energization of a circuit that has been described for that relay, and the picking up of relay K opens the circuit that has been described for the set winding of indicator BV1 at back contact 270, and thus conditions the indicator BV1 so that it can be responsive to the code that is stored in the relays 1C through 4C.

The indicator BV1 has individual terminals for the respective bits of the code, and its energization in accordance with the first four bits of the code is effected during the execution period by the energization of circuits comparable to those that have been specifically described when considering the operation of the station relays in response to the code storage in the relays 1C through 5C. Thus the indicator BV1 becomes actuated through diodes 272, 273, 274 and 275 during the execution period so as to be controlled in accordance with a code that has been received during the second word. The control circuit for indicator BV1 is selected by front contact 258 of the second word relay 2CY, and the control circuit for indicator BV2 is closed only at the end of the third word in accordance with the energization of the word counting relay 3CY.

*Clear out*

There are two conditions of clear out to be considered, one is the condition of a partial clear out at the end of each word, and the other is a consideration of clear out at the end of a cycle of operation including all words.

To consider first the mode of operation for clear out at the end of a word, it will be considered that the first word of a cycle has been transmitted as has been heretofore described. Reference can be made to the sequence chart of FIGS. 6A and 6B for a consideration of the sequence of relay operation upon the partial clear out that occurs at the end of the first word. It will be noted according to this chart that the code oscillators CT and CT1 become energized during the fifth step upon the picking up of the last of the counting relays. Thus the picking up of the relay 6C1 at the field station energizes the oscillator CT1 (see FIG. 4B) through a circuit including front contact 130 of relay 6C1. Similarly, at the control office, the oscillator CT becomes energized in accordance with the closure of front contact 101 of relay 6C (see FIG. 2B). At the time of energization of the oscillators, their right hand contacts are closed, and the oscillators complete their excursion to open the right hand contacts and close the left hand contacts before they become latched and held in their normal positions. Thus, irrespective of the energization of the oscillators during the fifth step, these oscillators complete the timing of the fifth step before they become latched.

At the transmitting station, the relays CD1 and CDP1 (see FIG. 4A) become picked up in response to the picking up of the relay 2CY1, the energization of which has already been considered when considering the mode of operation of the word counting relays. Relay CD1 becomes picked up at this time in accordance with the energization of a circuit for that relay including resistor 276, front contact 277 of relay LO1, upper winding of relay CD1, wire 278, front contact 279 of relay 1CY1, and front contact 280 of relay 2CY1. The picking up of this relay establishes a stick circuit including resistor 276, front contact 277 of relay LO1, lower winding of relay CD1, front contact 281 of relay CD1, and resistor 282. The picking up of relay CD1 causes the picking up of its repeater relay CDP1 in accordance with the energization of a circuit for the upper winding of that relay through front contact 286 of relay CD1.

Relay CD1 is made slow to drop away by a shunt provided for the relay through resistor 282, front contact 281 of relay CD1, lower winding of relay CD1, resistor 283 and capacitor 284. This slow drop away during the clear out at a station that has been transmitting gives another station priority for an immediate start. If a start occurs by another station before relay CD1 has become dropped away, the capacitor 284 becomes quickly discharged in accordance with the deenergization of the line relay LR1. This discharge takes place through back contact 277 of relay LO1 and back contact 285 of relay LR1, and provides for the immediate release of relay CD1.

Relay CTR1 becomes picked up at the end of the fifth step in accordance with the shifting of the contacts of the oscillator CT1. The circuit by which the relay CTR1 is picked up at this time includes front contact 243 of relay S1 (see FIG. 2B), contact 244 of oscillator CT1, front contact 245 of relay 6C1, wire 246 and lower winding of relay CTR1. The picking up of relay CTR1 closes the line circuit at front contact 247 to provide for the transmission of a mark during the period of rest between words, and thus the line relay LR1 at field station No. 1 and at all of the other field stations becomes picked up. Relay M1 is also picked up in response to the picking up of relay CTR1 by the energization of a circuit including front contact 287 of relay CO1, front contact 288 of relay CTR1, lower winding of relay M1, wire 289, and front contact 290 of relay SRP1. This relay is maintained energized by a stick circuit through its front contact 291 which shunts the contact 290 out of the circuit just described.

Upon the picking up of relay M1, a drive down circuit is closed for the relay 6C1 (see FIG. 5A). This circuit includes front contact 292 of relay S1, front contact 293 of relay 6C1, upper winding of relay 6C1, front contact 294 of relay CTR1, front contact 295 of relay LR1, and front contact 296 of relay M1. This relay is made quick to drop away in that its lower winding is shunted upon the establishment of the circuit just described through resistor 297. In response to the dropping away of relay 6C1, relay 1CY1 (see FIG. 4B) becomes dropped away upon the opening of a stick circuit that has been established for that relay. Such stick circuit includes front contact 298 of relay S1, front contact 300 of relay 6C1, front contact 301 of relay 1CY1, and lower winding of relay 1CY1.

The dropping away of relay 6C1 also causes the dropping away of relays 2C1 through 5C1. These relays have been maintained picked up throughout the cycle until the picking up of the relay CTR1 at the end of the fifth step by the energization of circuits corresponding to those which have been described for the step counter at the control office station. The picking up of the relay 6C1 at the beginning of the fifth step conditions a stick circuit that is closed for each of the relays 2C1 through 5C1 upon termination of the fifth step. This circuit is closed upon the shifting of the oscillator CT1 to close its left hand contacts at the end of the fifth step. The stick circuit that is established at this time for relay 2C1 includes front contact 292 of relay S1, contact 302 of oscillator CT1, front contact 303 of relay 6C1, diode 304, front contact 305 of relay 2C1, resistor 306, and upper winding of relay 2C1. A multiple circuit is also provided through the pick up and drive down windings of relay 2C1 connected in series as has been heretofore described when considering the mode of operation of the step counting bank. Similarly, a stick circuit has been established for each of the relays 3C1, 4C1 and 5C1. These stick circuits are opened by the dropping away of relay 6C1, thus causing the relays 2C1 through 5C1 to become dropped away during the rest period at the end of the first word.

Relay CDP1 (see FIG. 4A) becomes dropped away at the transmitting station at the end of the first word in accordance with the energization of a drive down circuit for that relay including front contact 243 of relay S1 (see FIG. 4B), contact 244 of oscillators CT1, back contact 245 of relay 6C1, wire 307, front contact 308 of relay CT1, front contact 309 of relay CTR1, and lower winding of relay CDP1. The dropping away of relay CDP1 causes the dropping away of relay CTR1 by the opening of a stick circuit by which relay CTR1 has been maintained energized. This stick circuit includes front contact 310 of relay CTR1, wire 311, back contact 312, of relay R1, wire 313, front contact 314 of relay M1, front contact 315 of relay CDP1, wire 316, front contact 79 of relay SRP1, wire 80, and upper winding of relay CTR1. The dropping away of relay CTR1 causes the dropping away of relay M1 by the opening of its circuit at front contact 288, and the dropping away of relay M1 opens the line circuit by the opening of front contact 196 to terminate the rest period. If it is selectively maintained deenergized or picked up again in accordance with the character to be transmitted during the first step of the second word. The selection of codes for transmission during the second, and subsequent words is in accordance with the mode of operation that has been heretofore considered relative to the transmission of codes.

With reference to the sequence chart of FIGS. 6A and 6B, it will be noted that the mode of operation at the receiving station upon clearing out during the rest period at the end of the first word is similar to that which has been described in detail as being effective at the transmitting station. At the receiving station, the codes are executed in a manner which has been heretofore described, the execution period being terminated by the driving down of the relay 6C (see FIG. 3A) by energy feeding through back contact 145 of relay S, front contact 146 of relay R, front contact 169 of relay 6C, front contact 317 of relay CTR, front contact 318 of relay LR and front contact 319 of relay M. This causes the dropping away of any of the counting relays C that may remain in their picked up positions due to having been used to store space characters of the code that has been received during the last word.

If the relay 1C is in its dropped away position because of having been dropped away to register a mark character during the first step, it is picked up at this time in accordance with the energization of a circuit including back contact 145 of relay S, front contact 146 of relay R, contact 147 of oscillator CT, back contact 148 of relay 6C, front contact 149 of relay CTR, back contact 150 of relay CD and upper winding of relay 1C. The dropping away of relay 6C also causes the dropping away of the relay K (see FIG. 3B) by the opening of the circuit for that relay at front contact 241. Relay 1CY (see FIG. 2B) is dropped away in a manner comparable to that which has been described for the dropping away of the relay 1CY1 at the sending station.

The receiving station has thus been conditioned to receive the next word of the communication cycle, and its oscillator CT is unlatched by the deenergization of the line circuit at the beginning of the second word so as to cause the dropping away of the line relay LR at the receiving station. The oscillator CT1 (see FIG. 4B) becomes unlatched at the sending station in response to the dropping away of relays CTR1 (see FIG. 4A) at the end of the rest period following the transmission of the first word. Thus the oscillators CT1 becomes deenergized by the opening of its circuit at front contact 142 of relay CTR1. The relay CDP1 becomes picked up at this time because of the opening of its drive down circuit at front contact 309 of relay CTR1.

Upon clearing out at the end of the last word, the mode of operation is similar to that which has been described for clearing out at the end of the first word except that certain additional relays become deenergized which have been maintained picked up throughout the cycle, and certain relays are energized to restore the normal conditions of the system. Thus the relay 1CY1 at the transmitting station becomes picked up during the fifth step in response to the picking up of relay 6C1. This relay remains picked up during normal conditions when the system is inactive. The pick up circuit for relay 1CY1 includes front contact 298 of relay S1, front contact 300 of relay 6C1, back contacts 320, 321, 322 and 323 of relays 2CY1, 3CY1, 4CY1 and 5CY1 respectively, and lower winding of relay 1CY1. This relay, when picked up, is maintained energized by a stick circuit corresponding to the stick circuit described for the normal energization of the relay 1CY at the control office station. The relay 1CY (see FIG. 2B) at the receiving station is similarly picked up in response to the picking up of relay 6C during the fifth step, except that it is energized in accordance with the closure of the front contact 172 of the receive relay R. When the relay CTR1 (see FIG. 4A) at the field station becomes picked up at the end of the fifth step of the last word, the relay SRP1 (see FIG. 4B) becomes dropped away by the opening of its circuit at back contact 136 of relay CTR1 (see FIG. 4A). Similarly at the receiving station, the picking up of relay CTR (see FIG. 2A) at the end of the fifth step causes the dropping away of relay SRP (see FIG. 2B) by opening the back contact 107 of relay CTR (see FIG. 2A) in the stick circuit for that relay.

The dropping away of relay SRP1 at the transmitting station causes the dropping away of relay LO1 at that station (see FIG. 4A) by the opening of a circuit for that relay at front contact 299 of relay SRP1. The dropping away of relay LO1 deenergizes the cycle distribution relay CD1, but this relay is made very slow to drop away by the shunting of its winding as has been described with the capacitor 284 and the resistor 283 connected in series. The stick circuit by which the relay CD1 has been maintained picked up is opened at front contact 277 of relay LO1. Relay 1CY1 becomes dropped away in response to the dropping away of the counting relay 6C1 in accordance with the opening of front contact 300 of relay 6C1 (see FIG. 4B), and the dropping away of relay 1CY1 causes the dropping away of relay S1 by opening its stick circuit at front contact 139 of relay 1CY1. The dropping away of relay S1 causes the dropping away of relay 1C1 (see FIG. 5A) by the opening of its stick circuit at front contact 292.

When the relay M1 becomes dropped away in response to the dropping away of relay CTR1 after the dropping away of relay CDP1, relay 1CY1 becomes picked up. The pick up circuit for relay 1CY1 (see FIG. 4B) includes the upper winding of relay 1CY1, back contacts 324, 325, 326, 327 and 328 of relays 2CY1, 3CY1, 4CY1, 5CY1 and 6CY1 respectively, wire 329, front contact 330 of relay CO1, and back contact 331 of relay M1.

The cycle distribution relays CD1 is made slow enough to drop away so that there will be time for a start to be initiated by another station to transmit and thus give each station a chance to transmit through one cycle of operation before a second cycle can be transmitted from the same station. After the relay CD1 has had time to drop away, its repeater relay CDP1 becomes dropped away by the opening of the circuit for that relay at front contact 286.

The mode of operation upon clearing out at the receiving station is similar to that which has been described at the transmitting station, except that the relay R is dropped away at the receiving station rather than the send relay S. There has been, of course, no relay LO, CD or CDP picked up a the receiving station during the cycle, and thus there is no mode of operating during the clear out period relative to these relays.

*Simultaneous starts*

In considering the means for initiating the system into a cycle of operation, it has been described as to how the station last to start becomes superior, and how the stations starting prior to that time are ruled out. A condition may arise, however, where a plurality of stations close the line circuit simultaneously, and thus become initiated as transmitters because the line circuit is registered at each of these stations as being energized immediately upon closure of the circuit at that station. Under these conditions, each of these stations continues to transmit, and each starts its pulse timing oscillator, the oscillator at the control office being started as has been heretofore described in accordance with the opening of the line circuit. Thus, inasmuch as these transmitting stations all closed the line at the same time, their oscillators CT1 are synchronized with each other, and are in proper time relationship with the oscillator that has been started at the receiving station at the control office. It is therefore provided that, even though oscillators are started at a plurality of field stations, they are in proper relationship to the oscillator at the receiving station so that proper communications can be maintained between either of the field stations that has started and the receiving station at the control office.

To take care of this situation of simultaneous starts codes are assigned to the field stations on a geographic code superiority basis so that all transmitting stations except one will be eliminated from transmission at least by the time the station codes are transmitted. The relay LO1 at each station monitors the response of the line relay LR1 at the associated station. During the first step of the cycle in which any one of the stations is sending a different line character, the station transmitting a mark will be rejected by a station transmitting a space during that character. Thus, although a plurality of stations are able to start simultaneously, only one is able to continue transmitting information during the balance of the cycle.

Having described one embodiment of a supervisory control system provided according to the present invention, it is desired to be understood that this form is selected to facilitate in the disclosure of the invention rather than to limit the number of forms which the invention may assume; and, it is to be further understood that various modifications, adaptations, and alterations may be applied to the specific form shown to meet the requirements of practice, without in any manner departing from the spirit or scope of the present invention.

What I claim is:

1. In a normally at rest code communication system for the communication of indication codes over a normally closed series communication channel connecting a receiving station with a plurality of remotely spaced transmitting stations, the combination comprising:
   (a) timing means at each of the transmitting stations for initially opening the communication channel for a given measured time interval in response to the initiation of a communication cycle at that station,
   (b) a step counter at each of the stations,
   (c) a normally inactive oscillator at each of the stations for determining the rate of operation of said counter,
   (d) means for starting the oscillator at each transmitting station upon termination of said given time interval measured at that station only provided that the communication channel is closed at all transmitting stations at that time, and
   (e) means response to the closing of the communication channel at all transmitting stations for initiating the operation of the oscillator at the receiving station,
   (f) whereby the transmitting station last to close the communication channel at the end of its given time interval has its oscillator started at a predetermined time in advance of the oscillator at the receiving station and the oscillators at the other transmitting stations remain inactive.

2. The invention according to claim 1 wherein said oscillators are free running subsequent to their initiation.

3. The invention according to claim 2 wherein said oscillators have their free running frequency determined by weighted pendulums.

4. The invention according to claim 3 wherein the oscillator pendulums are rotated by torsional springs.

5. In a code communication system having remotely spaced transmitting and receiving stations connected by a communication channel, the combination comprising:
   (a) step counting means at the receiving station for counting code bits received over the communication channel constituting a word,
   (b) said step counting means having a binary device for each bit for counting the bits received,
   (c) means for selectively actuating said binary device to store the character of each bit received during a step by distinctively conditioning the binary device that has been used for counting a prior step in accordance with the character of the bit received during each step,
   (d) word counting means controlled by said step counting means for counting a predetermined plurality of words constituting a communication cycle of operation, and
   (e) a plurality of registration devices controlled jointly by said step counting means and said word counting means to register indications for the respective words in accordance with the code stored by said counting device.

6. The invention according to claim 5 wherein station registration means governed by the code stored in the step counting means for a given word of a cycle is provided for selectively controlling different groups of registration devices during subsequent words in the cycle in accordance with the condition of said step counting means during such words.

7. The invention according to claim 5 wherein said step counting means includes a bank of normally deenergized relays and means for energizing the relays successively in a predetermined order for counting bits during the reception of each word.

8. The invention according to claim 7 wherein means is provided in response to the reception of each bit during a word to selectively energize the counting relay for the preceding step in accordance with whether the code bit is of one character or another.

9. The invention according to claim 8 wherein the step counting relays are selectively maintained picked up or are driven down in accordance with whether the bit received during a predetermined following step is a mark or a space character.

10. In a code communication system having remotely spaced transmitting and receiving stations connected by a communication channel, the combination comprising:
   (a) code receiving means at the receiving station responsive to a series of code characters transmitted over the communication channel for registering and storing the code characters received during the reception of a code constituting a word,
   (b) means controlled by said code receiving means for selectively energizing several code buses for the respective bits of a word in accordance with the code characters received as such bits,
   (c) a plurality of station registration devices, each device having a plurality of windings, and each device requiring the simultaneous energization of said plurality of windings for actuation,
   (d) circuit means for energizing said windings from respectively different ones of said code buses for each of said devices at the end of a word, and
   (e) means for inhibiting the operation of each of said devices at the end of a word if any of said buses are energized except the buses that are used for energization of said windings of that device.

11. The combination according to claim 10 wherein the code characters received and stored are mark and space characters.

12. The combination according to claim 11 wherein two out of five code characters must be marks to actuate one of said devices.

13. The combination according to claim 10 wherein said devices are relays, each of which having a plurality of windings.

References Cited

UNITED STATES PATENTS

| | | | |
|---|---|---|---|
| 2,059,204 | 11/1936 | Boswau | 340—163 |
| 2,468,065 | 4/1949 | Hartley et al. | 340—168 |
| 2,626,314 | 1/1953 | Coley | 340—163 |
| 2,907,980 | 10/1959 | Preston | 340—163 |
| 3,027,544 | 3/1962 | Atkinson et al. | 340—150 |

THOMAS B. HABECKER, *Acting Primary Examiner.*

NEIL C. READ, *Examiner.*

D. J. YUSKO, *Assistant Examiner.*